J. S. STEPHENS.
TRUCK.
APPLICATION FILED FEB. 20, 1917.
1,255,484.
Patented Feb. 5, 1918.
2 SHEETS—SHEET 1.
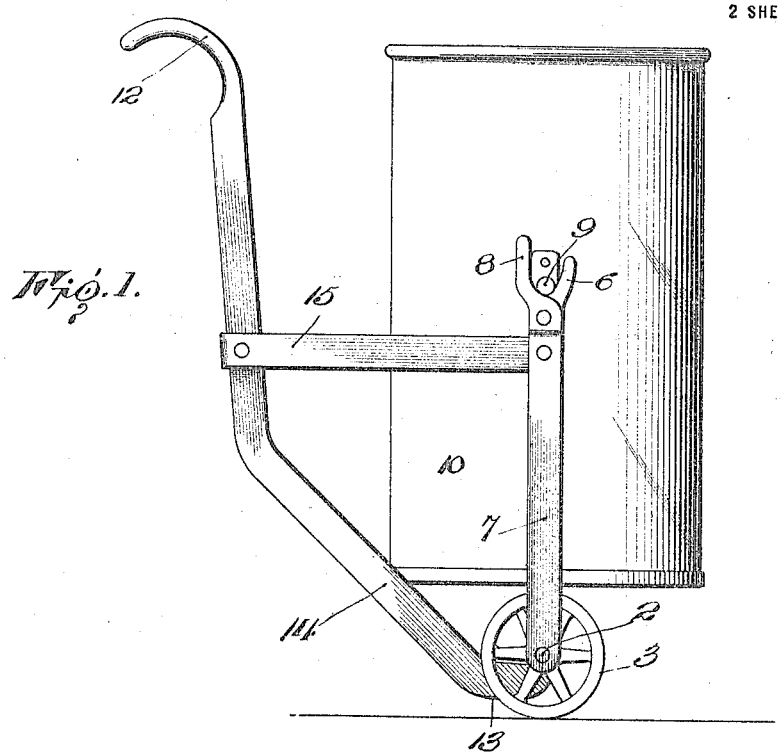
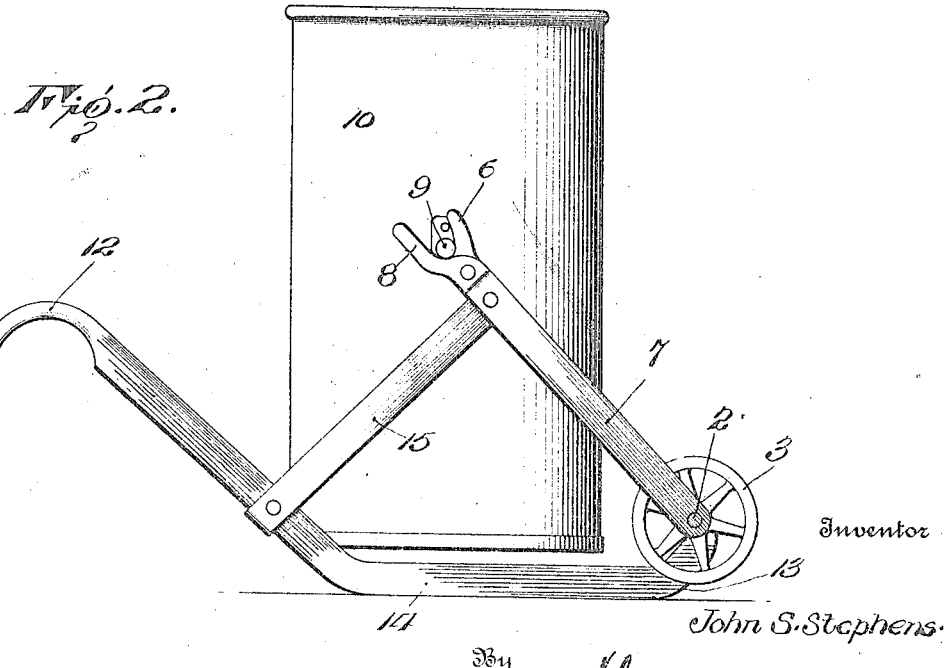
Inventor
John S. Stephens

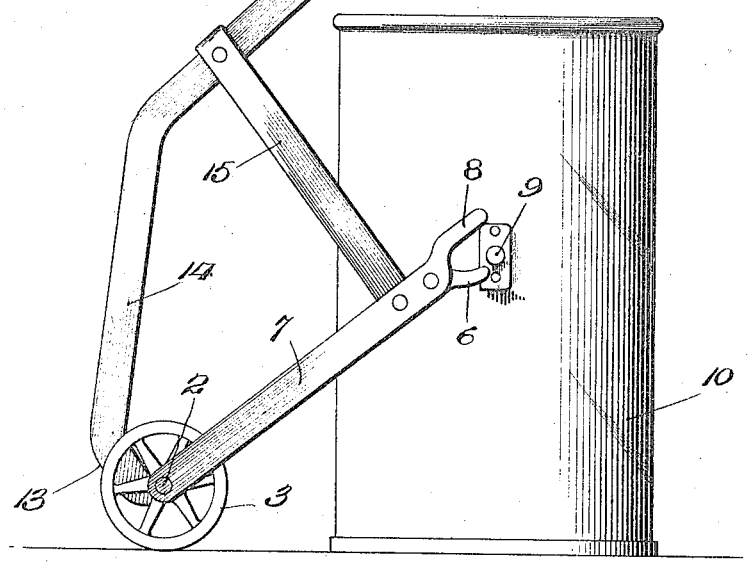
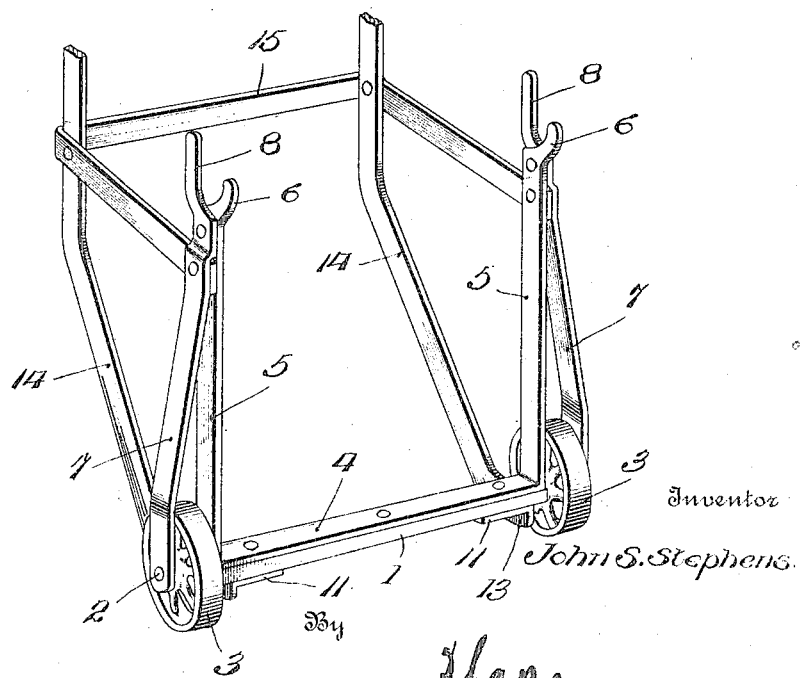

UNITED STATES PATENT OFFICE.

JOHN S. STEPHENS, OF PATERSON, NEW JERSEY.

TRUCK.

1,255,484.     Specification of Letters Patent.     Patented Feb. 5, 1918.

Application filed February 20, 1917. Serial No. 149,898.

*To all whom it may concern:*

Be it known that I, JOHN S. STEPHENS, a citizen of the United States, residing at Paterson, in the county of Passaic and State of New Jersey, have invented certain new and useful Improvements in Trucks, of which the following is a specification.

This invention relates to trucks, and has special reference to trucks for moving garbage pails from a building to a point where the contents may be collected and removed for destructive treatment. The invention seeks to provide a truck for handling garbage pails by which the pail may be lifted, moved to a place of deposit, and then released from the truck without being directly handled. A further object of the invention is to provide a truck of such a construction that the pail may be transported over snow or icy ground or may be carried up or down a flight of steps. The invention also seeks to improve the general construction of trucks for handling garbage pails to the end that the strength and durability of the truck may be increased without increasing the weight of the same or the cost of manufacture.

The invention is illustrated in the accompanying drawings in which,

Figure 1 is a side elevation of a truck embodying my improvements, showing the same disposed to transport a pail;

Fig. 2 is a similar view showing the truck arranged to transport a pail over snow or ice;

Fig. 3 is a similar view showing the manner of manipulating the truck so as to release a pail therefrom or to take up a pail which is to be moved;

Fig. 4 is a detail perspective view of the greater portion of the truck.

In carrying out my invention, I employ a stout bar 1 which has its ends formed into spindles or trunnions 2 upon which wheels 3 are mounted to rotate. A U-shaped bar 4 is secured upon the upper side of the bar 1 between the wheels 3 and the sides or standards 5 of the said bar have their upper extremities formed into forwardly projecting trunnion engaging members 6, as clearly shown. Fitted upon the outer extremities of the spindles or trunnions 2 are the lower ends of braces or posts 7 which rise from the axle and have their upper ends secured to the upper ends of the standards 5 immediately below the members 6 thereof. The extremities of the braces or posts 7 are offset rearwardly or formed into trunnion engaging members 8 which are disposed in rear of the members 6 and project above the same, as clearly shown. The members 6 and 8 coöperate to form yokes or seats which receive the trunnions or pins 9 projecting from the pail 10 and thereby support the pail, as clearly shown in Figs. 1 and 2. Secured to the under side of the axle bar 1 are the front ends 11 of the handle and runner members which extend rearwardly from the axle bar and then upwardly, the upper or rear extremities of these members being formed into handles or gripping portions 12, as clearly shown. The forward ends of these runner or handle members, immediately adjacent their extremities 11, are arcuate, as shown at 13, and from the said arcuate portions, straight portions 14 extend at an acute angle to the major dimension of the braces and standards 7 and 5. These straight portions 14, as shown most clearly in Fig. 2, are of such length that if they be brought into contact with the surface of the ground, they will form a substantial support for the truck and the pail and may be used as runners to move the pail over a snowy or icy surface. At the rear of the straight runner portions 14, these side bars or members are further bent so that they will then extend along lines approximately parallel with the standards 6 and terminate in the grip portions 12. A second U-shaped member 15 is employed to provide a rigid connection between the standards 5 and the side members, the transverse intermediate portion of the said frame passing in rear of the handle members and the side members of said frame being secured rigidly to the said handle members and having their front ends fitting between and rigidly secured to portions of the standards 5 and braces 7. I thus provide a very simple truck which will be of very strong construction.

It is thought the manner of using the truck will be readily understood from the foregoing description, taken in connection with the accompanying drawings. Assuming that a filled garbage pail is to be removed from a building to a point where it may be accessible to a collector, the truck is tilted upon the wheels 3, as shown in Fig. 3, and then moved toward the pail so that the standards 5 will pass on opposite sides of the pail and the seats or bearings formed by the members 6 and 8 will pass respectively below and above the trunnions or pins 9 on the sides of the pail. The said pins 9 will thus be engaged by the seats or bearings and if the truck handles be now swung downwardly the standards 5 and braces 7 will be caused to assume a vertical position, as shown in Fig. 1, thereby lifting the pail and bringing the rollers under the same. With the truck in the position just described and shown in Fig. 1, it is obvious the pail can be moved to any desired point and when that point has been reached the truck is swung in the reverse direction until it again assumes the position shown in Fig. 3, thereby depositing the pail upon the ground and releasing the truck therefrom. If the ground be covered with snow or be frozen, the grip portions 12 are lowered until the truck assumes the position shown in Fig. 2 when the members 14 will rest upon the ground and may be utilized as runners, as hereinbefore described. In moving the truck to the position shown in Fig. 2, the forward arcuate extremities 13 of the runners will first contact with the ground and, as the downward movement of the handles continues, will serve as fulcrums to lift the rollers from the ground, the transition being easy and gradual so that there is no liability to upset the pail and spill its contents. It is to be noted that the arcuate portions of the side members extend longitudinally of said members eccentrically to the axle bar and project from the axle beyond the periphery of the wheels. It will be readily understood from Fig. 1, that by bringing the runner members 14 into a plane which is parallel with or corresponds to a plane touching the forward edges of a series of steps, the device can be moved up or down a flight of steps without any jarring or jolting of the pail and to this end the runner members should, of course, be at least long enough to bridge two steps.

By the use of my device, a garbage pail may be moved rapidly and easily without any liability to be upset and without requiring the operator to directly handle the pail. The device is very simple in its construction, being composed of few parts and free of complicated arrangements, but the parts are so disposed and coupled as to possess maximum strength.

Having thus described the invention, what is claimed as new is:

1. A truck comprising an axle bar, wheels carried by the ends of said bar, standards rising from said bar adjacent the wheels and having their upper ends formed into forwardly projecting seats, braces extending upwardly from the axle bar beyond the wheels and secured to the upper ends of the standards, the upper extremities of said braces being formed into rearwardly extending seats, and side members secured to the axle bar and extending upwardly and rearwardly therefrom.

2. A truck comprising spindles, wheels mounted on said spindles, pail-supporting members rising from said spindles, side members having their front extremities connected to said pail-supporting members and having arcuate portions eccentric to the spindles and extending from the spindles beyond the peripheries of said wheels whereby to form rockers by which the wheels may be raised, said side members having runner portions extending rearwardly from said arcuate portions, and a rigid connection between the side members and the pail-supporting members.

In testimony whereof I affix my signature.

JOHN S. STEPHENS. [L. s.]

Copies of this patent may be obtained for five cents each, by addressing the "Commissioner of Patents, Washington, D. C."